United States Patent [19]
Shermeister

[11] Patent Number: 5,806,935
[45] Date of Patent: Sep. 15, 1998

[54] TENSION-LOCK SYSTEM FOR SPOKES IN SPOKED WHEELS

[76] Inventor: Chris J. Shermeister, 771 County Rd. PP, Sheboygan Falls, Wis. 53085

[21] Appl. No.: 774,621

[22] Filed: Dec. 30, 1996

[51] Int. Cl.[6] ..................................................... B60B 21/06
[52] U.S. Cl. .............................................. 301/58; 301/104
[58] Field of Search ................................. 301/55, 58, 61, 301/95, 96, 97, 98, 110.5, 104

[56] References Cited

U.S. PATENT DOCUMENTS

| 476,433 | 6/1892 | Vetterlein | 301/58 |
| 496,844 | 5/1893 | Baker | 301/59 |
| 703,029 | 6/1902 | Wilske | 301/104 X |
| 1,043,283 | 11/1912 | Zarth | 301/56 |

FOREIGN PATENT DOCUMENTS

| 2513185 | 3/1983 | France | 301/104 |
| 20745 | 10/1908 | United Kingdom | 301/58 |
| 39963 | 10/1933 | United Kingdom | 301/58 |

*Primary Examiner*—Russell D. Stormer

[57] ABSTRACT

A tension-lock system for the spokes of a spoked wheel includes a nipple having both internal threads (which mate with the external threads at one end of a spoke) and external threads. A lock-nut having internal threads to mate with the external threads of the spoke nipple, and is at one end convex shaped. A washer which is at one end, concave shaped to mate with the convex surface of the nut. As the wheel is being assembled, the lock nut and washer are slid over the threaded end of the spoke. The threaded end of the spoke is then placed through the hole in the rim. The nipple is then threaded onto the threads of the spoke until the wheel is in a "trued position". The washer and lock nut are then tightened onto the nipple, and against the rim, thus preventing the nipple from turning on the spoke and thereby maintaining the wheel in the "trued position". Another variation of the tension-lock system for the spokes of a spoked wheel includes a lock nut having internal threads which mate with the external threads at one end of a spoke. A nipple which passes through a hole in the rim of the wheel also includes internal threads which also mate with the spoke threads. The nut locks against one end of the nipple after both nipple and nut have been threaded onto the spoke into a "trued position", thus preventing the nipple from turning on the spoke and thereby maintaining the spokes in the "trued position".

10 Claims, 6 Drawing Sheets

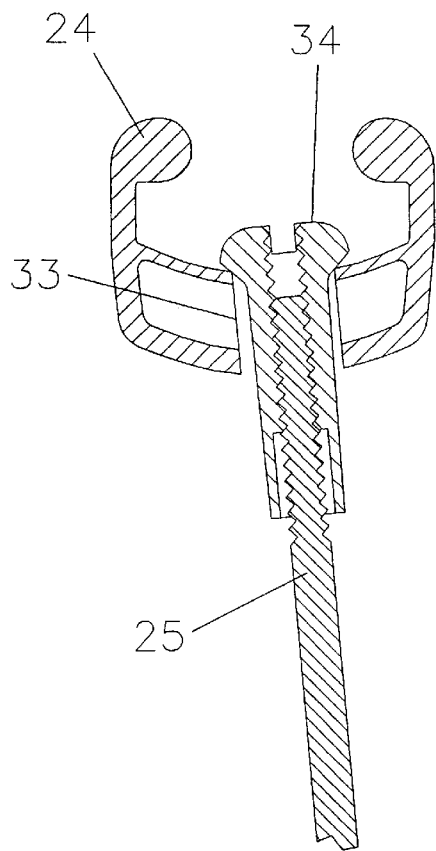
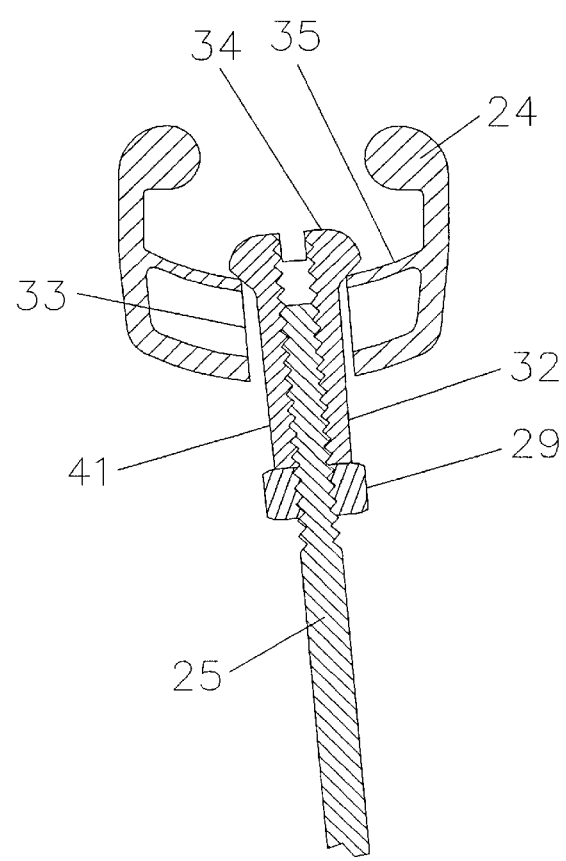
Fig. 2
Prior Art
Fig. 3

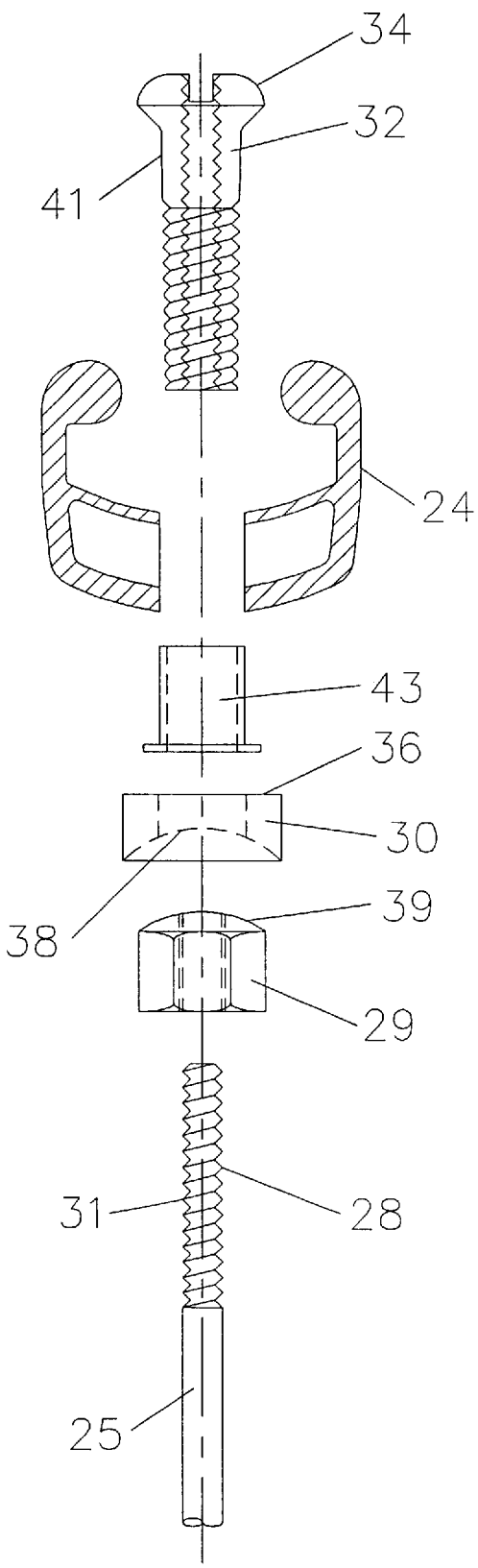

TENSION-LOCK SYSTEM FOR SPOKES IN SPOKED WHEELS

FIELD OF THE INVENTION

This invention relates to spoked wheels for bicycles, motorcycles, automobiles and the like, and to a system which prevents the spoke nipple from loosening on the spoke by locking the nipple to the rim or to the spoke. It more particularly relates to a system which incorporates a controlled tension-lock in the spoked wheel assembly, so as to provide a uniform wheel assembly. It more specifically relates to the construction and method of mounting the spokes in the rim of the wheel, so as to accommodate changing forces in the tension and angularity of the spoke as the wheel rotates through 360 degrees under the forces exerted by a movement under adverse conditions, as in speed trials or long-distance racing events.

BACKGROUND OF THE INVENTION

The tension-lock system of the present invention addresses the persistent problem intrinsic to every spoked wheel assembled with conventional spoke and nipple components. Specifically, the recurring problem is the loss of effective spoke tension which occurs gradually and increasingly as a result of the constant vibrations and shocks the wheel sustains during normal use.

Attention to this problem is not new, and reference is made to the Goldberg U.S. Pat. No. 3,907,372 issued on Sep. 23, 1975 and to the Klein U.S. Pat. No. 4,695,099 issued on Sep. 22, 1987.

To better comprehend the invention's purpose and actual function, the basic dynamic structure of a tension-spoked wheel must be understood. By reviewing its simple interacting fundamentals, the predicate supporting the claims made for the system of the present invention becomes readily apparent.

A conventional spoked wheel consists of four essential components: a rim a hub and a plurality of spokes, each with a spoke nut (sometimes known as nipples).

The spokes are anchored at the hub's two flanges (usually by means of their hooked or enlarged ends) from which they radiate outward, either directly or tangentially, to the rim. At the rim the spokes are secured by means of the spoke nipples, which are internally threaded to match the threaded portion of the spoke. The spokes, which are evenly distributed at the hub flanges, are, at the rim, joined by the nipples in an evenly separated sequence around the rim's circumference. The rim has holes to allow the spoke nipple to seat upon its outer circumference and also to align with its corresponding spoke.

The first step in assembling the wheel is to engage only a few threads of each spoke to the corresponding nipple. At this point, if the hub is held in hand and wiggled back and forth, the rim and spokes would rattle and shake in such fashion that it would seem impossible for them to support a bicycle and a rider. But as the spokes are carefully and methodically drawn deeper into their nipples, an amazing transformation happens. The wheel almost suddenly manifests a rigidity that minutes before seemed impossible. This surprising characteristic of the wheel evolved inevitably—if not at first discernibly—through the process of opposing each spoke in tension with every other spoke. Then, as the spokes are evenly tightened, i.e., tensioned, the rim can be centered horizontally and vertically over the hub. In the case of a rear wheel, the spokes ultimately can also be made rigid enough to permit the transmission of torque, from the driving hub to the rim.

The key to this simple and superb dynamic is, of course, sufficient and consistent spoke tension. Even very small amounts of tension loss will invariably register as deviation in the rim's movement around its axis. In effect, every spoke of the wheel is in a constant tug-of-war—each exerting an almost equal force between rim and hub so long as its opposing counterpart does likewise.

It is this state of tuned equilibrium that establishes the stability and rigidity of the wheel. Forces acting to move the rim in any direction away from the hub are resisted by powerfully unified spoke tensions. The rim will remain "true", i.e., round and centered over the hub axis consistent with the maintenance of the required spoke tensions.

How and why a spoked wheel goes out-of-true, sometimes even collapsing into a pretzel-like configuration, is ultimately explained in terms of spoke-tension loss. The adverse forces acting to de-stabilize the balance of spoke tensions in a wheel are: road shock induced from road bumps or ruts; lateral impacts to the tire, rim or spokes; excessive spoke loads from extreme weight (which compresses or "eggs" the rim); and torque, i.e., twisting forces acting on the spokes as power is transmitted from a rear hub to rim. All of these independently and collectively act against any spoke's tension that is not sufficiently high enough to retain its nipple securely.

Several other secondary factors cause spoke-tension loss. Considered individually, their impact is minimal. In conjunction, however, they play a significant role in the degradation of a spoked wheel's durability. These secondary factors are: compression of the spoke and nipple threads; spoke-hole elongation at the hub; and spoke elasticity or "stretch". In one important respect, these phenomena have in common the effect of very gradually reducing spoke tensions by decreasing the distance between the spoke nipple's seat at the rim and spoke's anchor point at the hub. At some point in the life of the wheel, even the small reductions of spoke tensions for which these factors account, will eventually require correction.

Finally, there is another agent involved in a spoked wheel's spoke-tension losses. To discerning and knowledgeable wheel builders, this problem is known as spoke twist. Such term is aptly derived from the tendency of a bicycle spoke to twist as it reaches optimum practical tension levels. A spoke's property of flexibility is well-known. After all, bike spokes do bend effortlessly. Not so apparent is this property of torsibility, i.e., twistability, because, in a wheel, it becomes apparent only at the very end process of assembly. In a much abbreviated description, here is how spoke wind-up asserts itself.

As the spokes are drawn ever deeper into their nipples, the pressure exerted at the interfaces of the mating threads increases tremendously and rapidly, enough so as to eventually cause thread-bind. Initial spoke twist is very difficult to detect visually. When it happens, nipple and spoke begin to rotate together as if a single entity, and in consequence of that, increases of turning force upon the nipple are difficult not to mistake as the normal concomitant of the increase of spoke tension.

In effect, at this final step of fine adjustments where minor rim deviation is being corrected, and when the ultimate tension (wheel rigidity) is sought, what is being introduced into an elegant structure is the unseen flaw of spoke twist. By its very name, this implies also the probability for an opposite reaction, (i.e., untwisting of the spokes). A twisted spoke contains torsional energy restrained from release by the nipple contact pressure at the rim.

Immediately, in co-action with those forces is the potential energy of twisted spokes, sufficiently able to expend itself fully or incrementally, whenever the nipple contact pressure at the rim involves inadequate resistance. Then, no matter if the nipple unwinds with the spoke or not, a tension differential must occur which invariably causes some amount of rim deviation. This nettlesome phenomenon is very difficult to avoid, especially when high spoke tension is generated, as when using both aluminum alloy nipples and rims.

In each and every one of the events leading to spoke-tension loss, there is always a corresponding alleviation of purchase pressure between nipple and rim. Spoke nipple retention at the rim is manifestly key to the integrity of a well-built wheel. It is self-evident that high spoke tension implies strong nipple retention, but this relationship leads to a means to preserve both.

Consider, in application, a commercially available product commonly employed for securing threaded fasteners, a product such as manufactured by the Loctite Company of Hartford, Connecticut. The use of such a product addresses the potential for spoke nipples to loosen. But the use of thread-locking chemicals is only a partial solution. There is the inconvenience factor which dissuades wheel assemblers from its universal use.

First of all, in using thread-locking chemicals, a bond must be assured which is strong enough to resist and endure the kinds of torque acting on the nipple. Experience has indicated that only those products are reliable which provide permanent bonding of nipple to spoke. However, if one considers the reasons causing tension variations in the wheel, one sees a need for spoke re-adjustments. But how can deviations of the rim be corrected by tension adjustment at the nipple after it has been chemically rendered immovable? By inhibiting nipple unwind, it most certainly will mitigate tension losses in the wheel, but its efficacy is symptom-directed.

SUMMARY OF THE INVENTION

The tension-lock system of this invention provides a mechanical solution to the problem of spoke tension loss emanating at the spoke nipple. The tension-lock system nipple is made integral with the rim once its matching nut is firmly fastened at its washer's seat. The tension-lock system nipple of the present invention differs from a conventional counterpart by its provision of external threads. Thus it permits a wheel assembler to employ standard spokes, hubs and rims.

In application, the tension-lock system requires but two additional steps in the assembly of the wheel. The tension-lock system washer and nut must be placed on the spoke before the nipple is inserted through the rim's spoke nipple orifice. The wheel is then completed in a sequence unvarying from the assembler's own technique.

The second additional step is performed after the assembler has completed truing the wheel. At this point, the washer is then brought to rest against the rim, its depressed or concave side facing the hub (i.e., away from the rim). Then the nut is threaded onto the nipple and tightened until its mating end, having a radius, firmly seats within the spherical washer. The inside diameter of the washer is slightly greater than the outside diameter of the nipple. This permits a self-centering action of the mating nut as it is drawn down, generally disposed at an angle to the rim. As joined, the tension-lock system nut, washer and nipple become integral with the rim. The spoke nipple is thereby locked firmly in its rim seat where it will remain until disassembly is chosen or required.

There is another benefit from using the tension-lock system. Imagine a spoked wheel being gradually squeezed by a powerful force inward toward its center from two opposite sides at the rim. As the rim begins to yield, the wheel deforms into an oval or an egg shape. If the force were irresistible, the destruction of the rim would not be stopped by the spokes, even though the tensions of some would increase tremendously, while simultaneously for at least as many more, the tension values would reach zero.

This does not happen when the wheel is equipped with the tension-lock system. Viewed from the side, the rim would become egg-shaped as the crushing force was slowly applied. However, when viewed from above the wheel, the spokes begin to protrude outward from the top surface of the rim where its diameter was being shortened. The spokes cannot come through because the tension-lock system nipple would remain fastened to the rim. In consequence, before the rim would fail, the compressing energy would diffuse through a bowing action of the spokes. Thus the tension-lock system substantially increases a wheel's resistance to compressions of the rim.

The rim/nipple integration of the present invention preserves unified and uniform spoke tensions under the stress of torque transmission from hub to rim. The tendency of driving spokes to push above the rim's circumference and thereby relax tension is countered. Rim structural capacity to support loads and sustain adversity is augmented.

The fatigue life of the spoke is extended by preventing spoke flotation between rim and hub; movement of which accelerates the failure of spokes at their highly stressed bend where they attach to the hub.

The latent energy of spoke-twist is contained by a locked nipple.

The tension lock system prevents the spoke nipple from loosening by rigidly clamping the rim between the tension lock washer and the spoke nipple. This prevents any relative motion between the rim and nipple which may allow the spoke nipple to loosen.

There are two forces acting on the spoke nipple which may cause it to loosen: axial stress and torsional stress.

Axial Stress

When the spoke nipple is threaded onto the end of the spoke and tightened (while the other spoke end is prevented from rotating by the hub flange), it imparts an axial stress in the spoke. The only forces holding the nipple from rotating (loosening) is the helix angle of the threads and the coefficient of friction between the threads of the nipple and spoke. Therefore, any relative motion between the nipple and spoke will allow the nipple to loosen.

This concept can be thought of as a small block sitting on an inclined plane. The friction between the block and the surface of the plane holds the block in place. If the plane is now vibrated, the block will tend to slide down the plane.

Torsional Stress

When the spoke nipple is tightened, this imparts a torsional stress in the spoke since it is somewhat elastic, allowing one end of the spoke to twist while the other is fixed.

A standard wheel relies solely on the spoke tension to cause enough friction between the spoke and nipple threads to hold the nipple in place However, under normal use, a bicycle rim will vibrate and flex. This relative motion between the rim and nipple reduces the "clamping" force between them, thus allowing the nipple to "self-loosen".

The tension lock system solves this "self-loosening" problem by rigidly clamping the rim between the spoke nipple and the washer. Therefore, when the rim deflects, the nut maintains the clamping force between the nipple, rim and washer, thus preventing the nipple from self-loosening.

With the above and other objects in view, further information and a better understanding of the present invention may be achieved by referring to the following detailed description.

For the purpose of illustrating the invention, there is shown in the accompanying drawings a form thereof which is at present preferred, although it is to be understood that the various instrumentalities of which the invention consists can be variously arranged and organized, and that the invention is not limited to the precise arrangement and organizations of the instrumentalities as herein shown and described.

BRIEF DESCRIPTION OF THE DRAWINGS

In the drawings, wherein like reference characters indicate like parts:

FIG. 2 is a drawing of a spoke and nipple arrangement of the prior art.

FIG. 3 is a drawing of one embodiment of the present invention.

FIG. 7 is an exploded view of the elements forming the tension-lock system of the present invention.

Referring now to FIG. 1, there is shown a bicycle 20 having a pair of wheels 21. Each wheel has a hub 22 at the center thereof, and a tire 23 mounted on a rim 24, all as is well-known in the art.

Connecting the hubs 22 and the rim 24 are a plurality of spokes 25 known in the art. FIG. 2 shows how this has been done by prior artisans.

Figure 5:
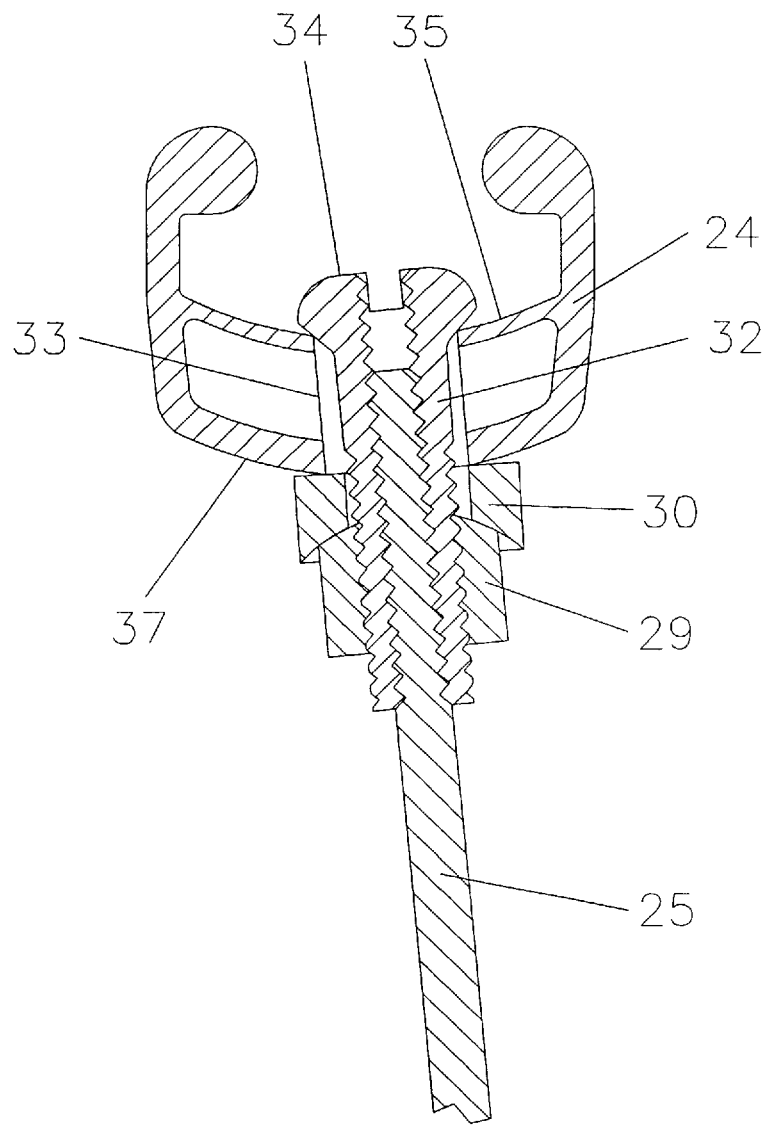
FIG. 5 is an enlarged view of the spoke and rim of another embodiment of the present invention, shown on an enlarged scale.

The significant aspect of the present invention is the method of connecting the spokes 25 in the rim 24, all as more clearly shown in FIGS. 3 and 5 and in the exploded view of FIG. 7.

Figure 6:
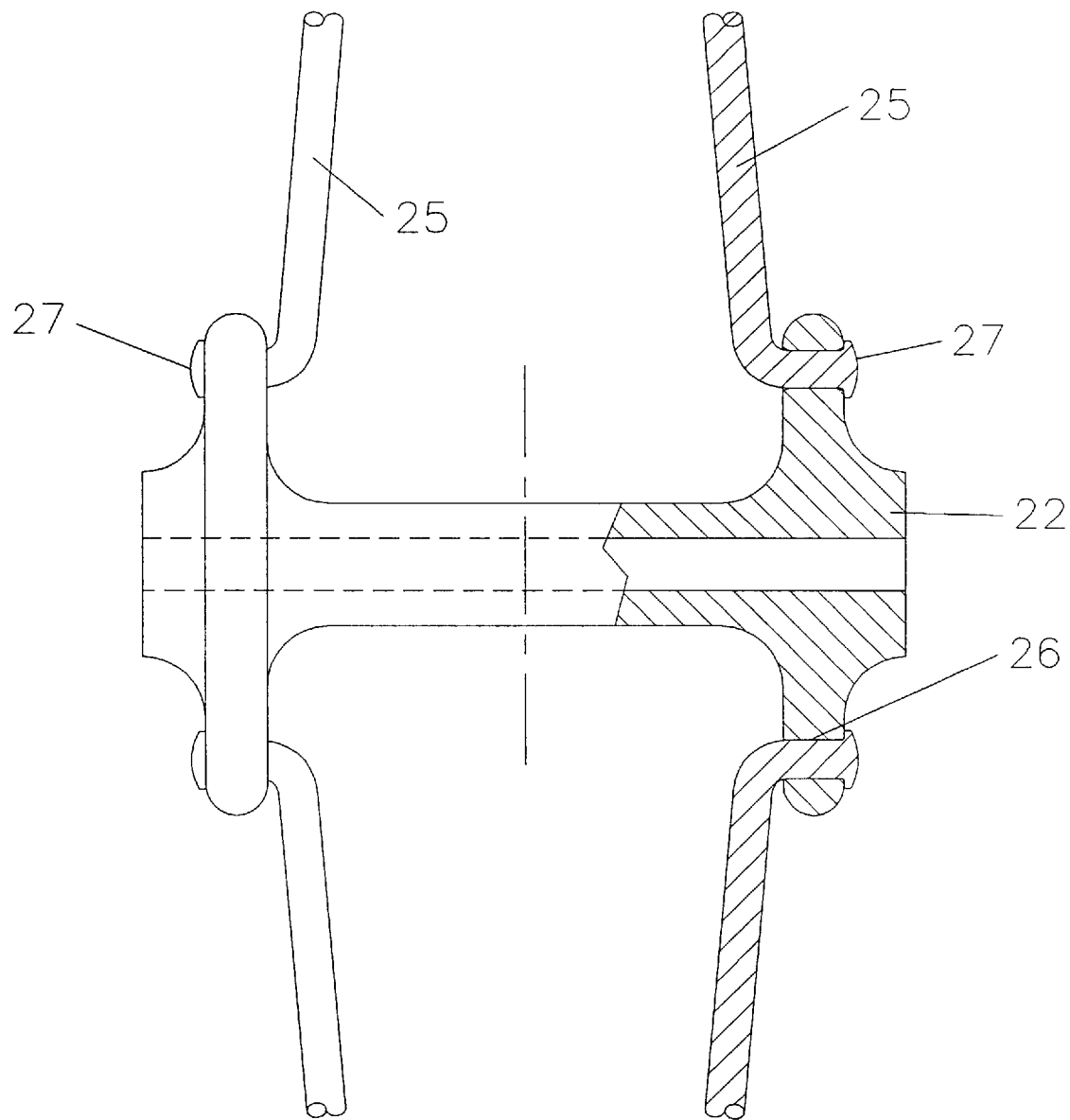
FIG. 6 is a fragmentary view of the wheel-hub with spokes affixed thereto.

When mounting the rim 24 to the hub 22, the spokes 25 are passed through holes 26 in the hub 22 until the spoke head 27 at one end of the spoke 25 is caught in place as is shown in FIG. 6.

With reference to the embodiment shown in FIG. 5 a nut 29 and a washer 30 are slipped over the outer end 28 of the spoke 25.

Then the nipple 32 is passed through a hole 33 in the rim 24. The nipple 32 is internally threaded, as is clearly shown in FIG. 5, and is screwed upon the threads 31 until the nipple head 34 abuts the inner surface 35 of the rim 24.

Then the washer 30 is slid upwardly on the spoke 25 until the flat surface 36 reaches the underside 37 of the rim 24.

The washer 30 has a concave surface 38, and when the nut 29, which has a convex surface 39 meets the concave surface 38 of the washer 30, the nut 29 is screwed to bring the rim, collar, connector and nut into a snug configuration as is shown in FIG. 5.

Figure 1:
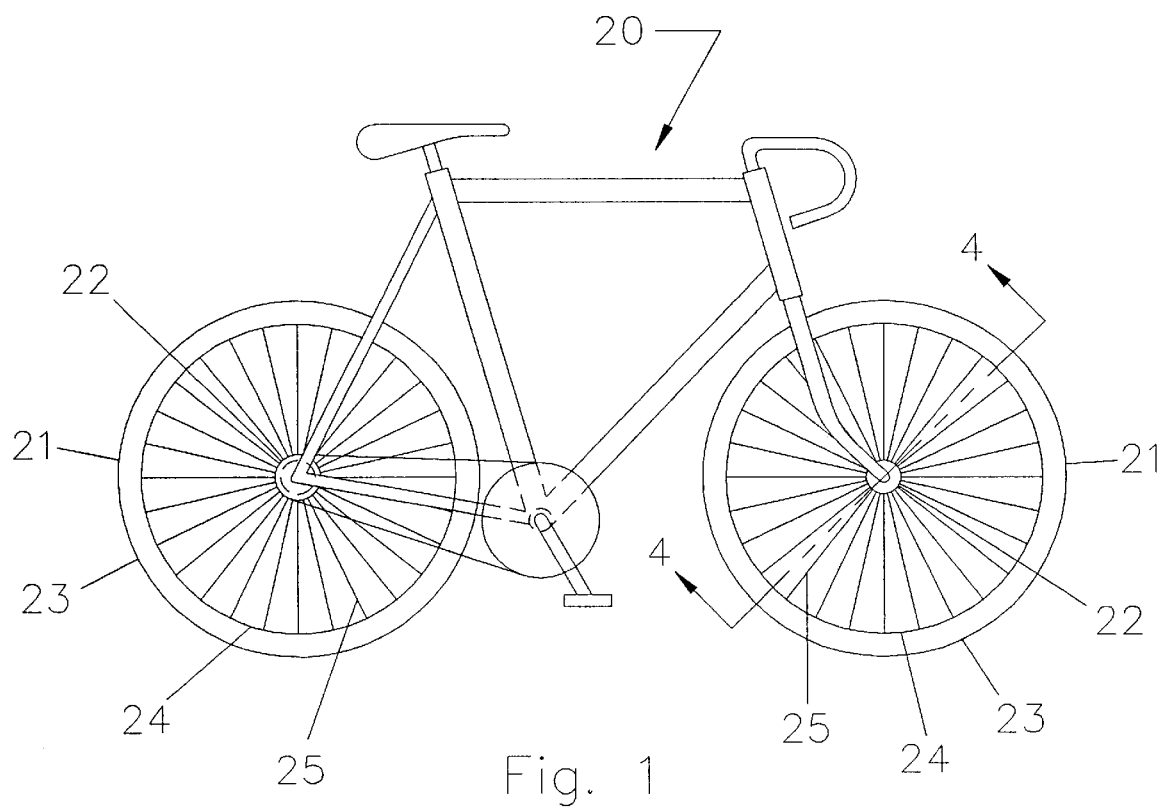
FIG. 1 is a stylized drawing of a bicycle with spoked wheels.
Figure 4:
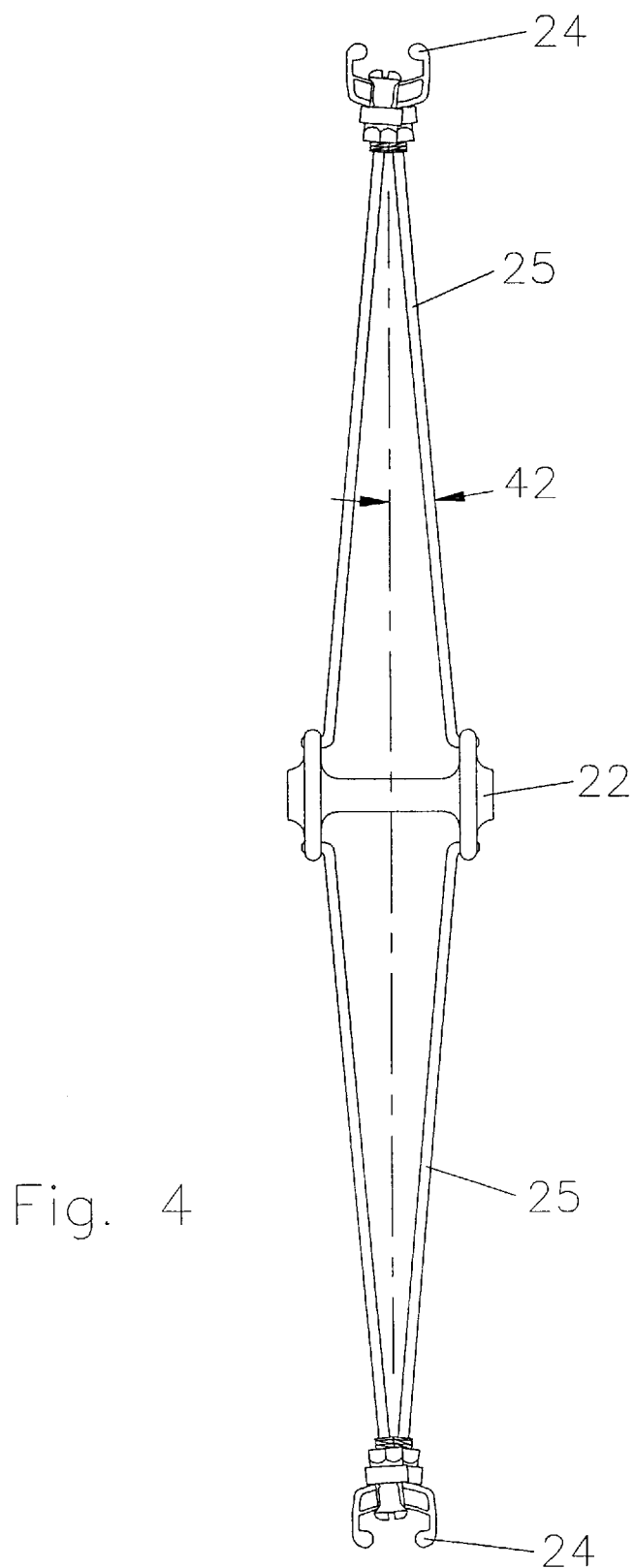
FIG. 4 is a cross-section taken generally along line 4—4 of FIG. 1.

Although the nut, collar, ring and spoke are bound tightly together shown in FIG. 5, nevertheless, because the diameter of the hole 33 in the rim 24 is larger than the outside diameter 41 of the nipple 32, and because the mating concave surface 38 of the washer 30 and the convex surface 39 of the nut 29 have the same radius and are "mating", the spoke 25 can, in fact, have a slight lateral movement as shown by the arrows 42 in FIG. 4.

As shown in FIG. 7, one may also have a ferrule 43 on the innerside 37 of the rim 24, against which the flat surface 36 of the washer 30 can abut, limiting lateral movement of the spoke, nut, ring and collar.

Referring to the embodiment shown in FIG. 3, the assembly consists of spoke, nipple and nut only. Thus in this embodiment the nut 29 is locked directly against the end of the nipple 32.

In both of the embodiments, once the wheel is trued, the lock nut prevents the nipple from turning.

It is further to be understood that the present invention may be embodied in other specific forms without departing from the spirit or special attributes; and it is, therefore, desired that the present embodiments be considered in all respects as illustrative and, therefore, not restrictive, reference being made to the appended claims rather than to the foregoing description to indicate the scope of the invention.

Having thus described the invention, what is claimed as new and desired to protect by Letters Patent are the following:

1. A tension-locking system for the spokes of a spoked wheel assembly, said system comprising a rim, a hub, a plurality of spokes, locking nuts, and nipples:
   said nipple having a body with a diameter and an internally-threaded passageway therein,
   a head on said body, said head having a diameter larger than the diameter of said body,
   said locking nuts having an internally-threaded spoke-receiving passageway,
   each of said spokes being threaded at one end and having a hub-engaging head on the other end,
   said threads on the ends of the spokes matching the threads of the internally-threaded passageways, of the nipple and locking nut,
   said rim having holes adapted to receive said body,
   said holes being larger in diameter than the diameter of said body and smaller than the diameter of said head.

2. The tension-locking system of claim 1 wherein said locking nut is tightened against said nipple to prevent loosening of said nipple on said spoke.

3. The tension-locking system of claim 2 including a plurality of ferrules, one surrounding each hole in said rim.

4. A tension-locking system for the spokes of a spoked wheel assembly, said system comprising a rim, a hub, a plurality of spokes, locking nuts, washers, and nipples:
   said nipple having a body with a diameter and an internally-threaded spoke-receiving passageway therein,
   said body having external threading,
   a head on said body, said head having a diameter larger than the diameter of said body,
   each of said spokes being threaded at one end, and having a hub-engaging head on the other end,
   said threads on the ends of the spokes matching the threads on the internally-threaded passageway, said locking nuts having a convex surface, and having internal threads to mate with the external threads of said body, said washer having one concave surface to mate with said locking nut, and the opposite surface contoured to conform to the surface of said rim, and a hole which is larger in diameter than the external threads on said body.

5. A tension-locking system of claim 4 wherein said locking nuts and washers are rotatably mounted on said external threads and arranged to grip said rim between said locking nuts and washers, and said head.

6. A tension-locking system of claim 5 including a plurality of ferrules, one surrounding each hole in said rim.

7. The tension-locking system of claim 4 wherein said nipples are disposed in said holes in said rim, said nipples are threaded onto the external threads of said spokes, to bring said head tightly against one side of said rim, said washer and said locking nuts being on the other side of said rim, and rotatably mounted on the external threads of said body, securing said locking nut and washer, and said head to either side of said rim, whereby said spoke is secured at an angle of less than 15 degrees, defined between the spoke and the axis of said hole in said rim.

8. A tension-locking system of claim 7 including a plurality of ferrules, one surrounding each hole in said rim.

9. The method of fastening a spoke between the hub and rim of a spoked wheel, which method includes:

providing a rim with a hole in it and a hub with a hole in it, providing a spoke between the holes of said rim and said hub, providing a locking nut having a convex surface and having internal threads to mate with the external threads of said nipple, providing a washer having a concave surface to mate with the said locking nut, and the opposite surface contoured to conform to the surface of said rim, and a hole which is larger in diameter than the said external threads on said nipple, passing the spoke through the hole in the hub, until the head of said spoke engages the hub, passing the threaded end of the spoke through said locking nut and said washer and hole of said rim, providing a generally tubular nipple having a head and a body, said body having internal threads and external threads, and an outside diameter smaller than the diameter of said hole in said rim, threading said nipple onto said spoke bringing said head of said nipple tightly against one side of said rim, and subsequently tightening the locking nut and washer against the other side of said rim.

10. The tension-locking system of claim 9 including a plurality of ferrules, one surrounding each hole in said rim.

* * * * *